United States Patent [19]
Mahotka et al.

[11] 3,975,063
[45] Aug. 17, 1976

[54] PROGRESSIVE SLIDE ASSEMBLY

[75] Inventors: Hans Mahotka; Manfred Glastetter, both of Anaheim, Calif.

[73] Assignee: NL Industries, Inc., New York, N.Y.

[22] Filed: May 12, 1975

[21] Appl. No.: 576,870

[52] U.S. Cl. ............................. 308/3.8; 312/341 R
[51] Int. Cl.² ........................................ F16C 29/00
[58] Field of Search............ 308/3 R, 3.8, 201, 199, 308/200, 6 R; 312/341 R, 341 NR, 342, 343, 344, 345, 346, 347, 348

[56] References Cited
UNITED STATES PATENTS 2,692,170   10/1954   Penkala ............................ 308/3.8
3,451,730   6/1969   Krispinsky et al. ................. 308/3.8
3,857,618   12/1974   Hagen et al. ....................... 308/3.8

*Primary Examiner*—M. H. Wood, Jr.
*Assistant Examiner*—Gene A. Church

[57]   ABSTRACT

A progressive slide assembly comprising three nested channel members or slides, the outer one of which is adapted to be fixed, has a rack and pinion gear assembly for effecting positive sliding movement of the intermediate slide, progressively, with the inner slide and uniformly throughout the entire length of travel of the intermediate and inner slides.

15 Claims, 6 Drawing Figures

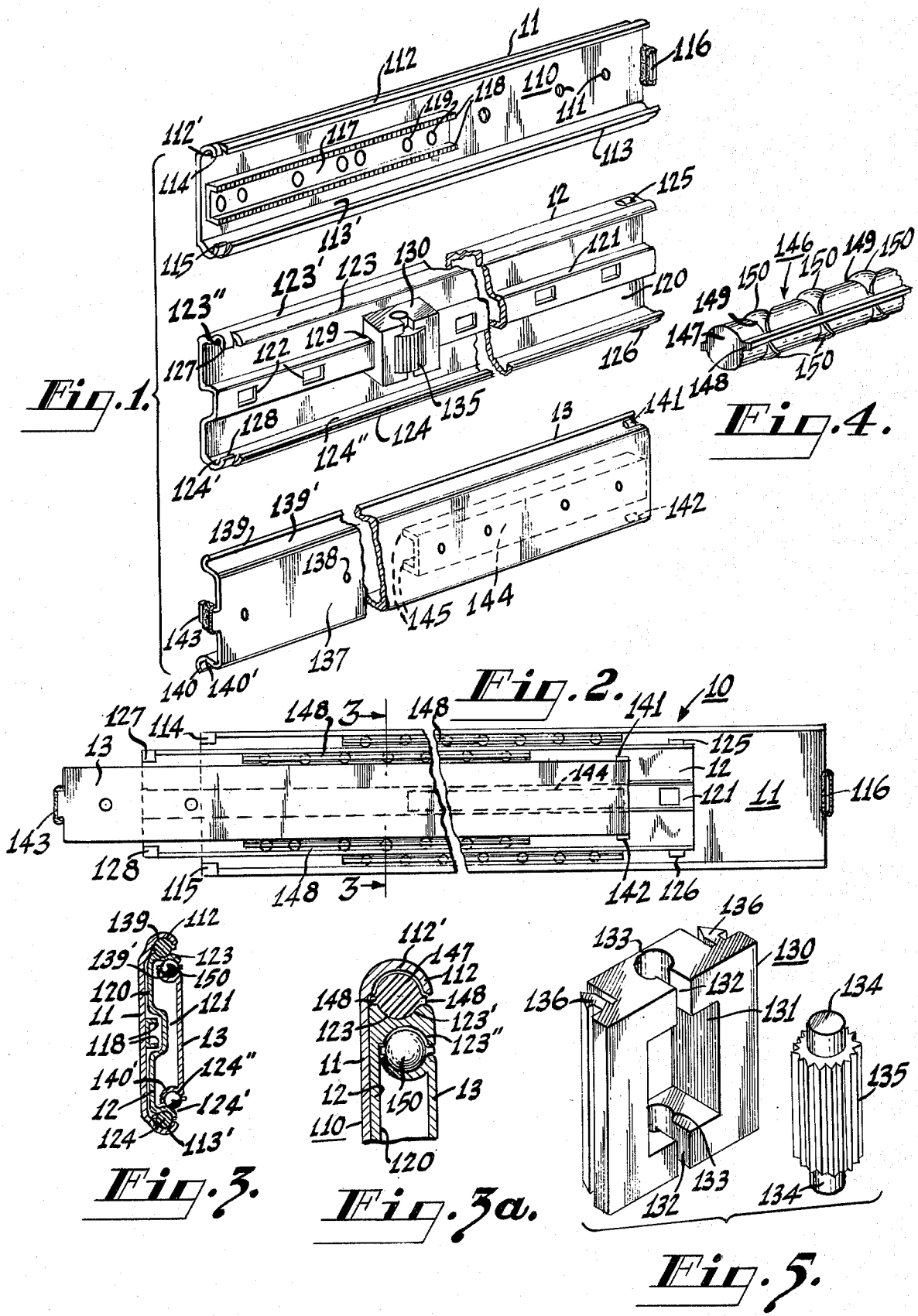

PROGRESSIVE SLIDE ASSEMBLY

BACKGROUND OF INVENTION

By way of definition a progressive slide assembly, sometimes referred to in the art as a progressive slide suspension, is known in the trade as one wherein the two moving slides of the three slide assembly move outwardly progressively so that both slides reach full travel simultaneously; as opposed to the older type of assembly wherein one slide moves outwardly, collects the second slide and pulls the latter out to its full extension. It is recognized that progressive slide assemblies have several advantages in that they are normally quieter in operation, are smoother acting, distribute the load more evenly and remain operable over longer periods of use.

Progressive slide assemblies are used extensively, but not exclusively, for slidingly supporting the drawers of filing cabinets and are characterized generally by three channel shaped members arranged in nested relationship, one slide, hereinafter referred to as the outer slide, being secured to the file cabinet and the other two slides, that is the intermediate and inner slides, being slidable longitudinally relative to the fixed outer slide and to each other, the inner slide being the one which supports the filing cabinet drawer. In the past it has been the practice to provide progressive slide action between the intermediate and outer slides by means of one or more anti-friction elements, that is to say ball bearings, sometimes referred to as propeller ball(s). Typical of these earlier progressive slide assemblies are the drawer suspensions shown in U.S. Pat. No. 1,963,220 Anderson 6/19/34, U.S. Pat. No. 2,346,167 Jones et al. 4/11/44 and U.S. Pat. No. 2,805,106 Penkala 9/3/57. In the aforesaid patents the progressive action of the slides is effected by a propeller ball and hence is not a positive drive between the moving slides but is dependent on friction drive which, in turn, is dependent on continuity of the applied load, that is to say, if the load on the slides is insufficient the friction drive of the propeller ball fails and the progressive action of the slides is cancelled out.

Other known designs use a wheel as the friction drive; and U.S. Pat. No. 3,545,833 Stein 12/8/70 describes a progressive slide assembly alleged to overcome the disadvantages of friction drive by utilizing a flexible cable arranged in the form of a loop with its ends secured to the outer slide, the cable being looped over suitably spaced pullies or pins projecting from the intermediate slide. While this design may avoid dependency on load for effecting progressive action of the slides it is nevertheless dependent on friction drive and hence is less than positive.

SUMMARY OF INVENTION

The present invention relates in general to progressive slide assemblies for file cabinet drawers, carriages and the like. More particularly, the invention relates to a progressive slide assembly wherein a positive drive is maintained between the intermediate slide and the inner slide of the assembly independently of load by providing a rack and pinion assembly between the outer, intermediate and inner slides. The invention also provides a progressive slide assembly which is positive acting embodies novel anti-friction means both for slidingly supporting the slides for longitudinal movement relative to each other and positively limiting their length of travel; and in addition is of relatively simple, noiseless and durable construction.

DESCRIPTION OF DRAWINGS

FIG. 1 is an exploded, perspective view of the three slides of the progressive slide assembly of this invention;

FIG. 2 is an elevation of the assembled slides of FIG. 1 with the intermediate slide and inner slide partially extended.

FIG. 3 is an enlarged end elevation of the assembled slides on line 3—3 of FIG. 2;

FIG. 3a is an enlarged detail of FIG. 3.

FIG. 4 is an enlarged fragmentary perspective view of one of the ball bearing retainers used in the progressive slide assembly; and FIG. 5 is an enlarged, exploded, perspective view of the pinion gear and its mounting block.

PREFERRED EMBODIMENT OF THE INVENTION

While progressive slide assemblies are used extensively for slidingly supporting drawers in file cabinets there are other more sophisticated areas of use as for example in the field of electronics, astronomy, high fidelity systems and the like wherein a high level of precision as well as relatively noiseless and consistently uniform performance are required in the operation of a carrier or the equivalent relative to a fixed support. The progressive slide assembly of this invention is, in its preferred embodiment, in the latter category and in this connection the individual slides are formed of relatively heavy gage zinc-plated steel, although stainless steel may be used, which precludes sagging or flexing of the slides, lateral distortion and/or malfunctioning due to corrosion, rusting or the like. It will be understood however, that the material of construction of the slide assembly of this invention is not so limited but may comprise relatively light metal stock, plastic or the like.

Referring now to the drawings the progressive slide assembly is indicated generally at 10 in FIG. 2. While it is conceivable that there could be instances wherein one slide assembly would suffice to support a carriage or table for movement in a horizontal plane, in most instances progressive slide assemblies are used in pairs each being fixedly mounted in a vertical plane for supporting a drawer, carrier or the like for longitudinal movement in a horizontal plane. Since each progressive slide assembly is a mirror image of the other the description of one will, in the interest of brevity and clarity, suffice for both. As shown by the exploded view of FIG. 1 each slide assembly comprises three elongated substantially rectangular channel shaped members or slides 11, 12 and 13 respectively. The slide 11, hereinafter referred to as the outer slide, comprises a base-portion 110 adapted to be secured to a fixed support such, as for example, a file cabinet frame, wall or the like, by suitable fastening means. The fastening means may comprise screws, bolts or the like engaged in a series of apertures 111 extending longitudinally of the base-portion 110 of the slide substantially coincident with its longitudinal axis; or may be comprise mounting tabs struck from the base-portion 110 and adapted to engage in slots formed in the side wall of the cabinet. The upper and lower edges of the outer slide are bent inwardly, that is, toward the intermediate slide 12, to provide flanges 112 and 113 respectively each of which is curved in cross section, as shown especially well in FIG. 3, to form ball bearing races 112′ and 113′, respectively. The outer ends of each race, that is to say the left-hand end, as seen in FIG. 1, is provided with an integral stop or protuberance 114 and 115, respectively, formed, for example, by bending the outer extremity of the corresponding flange inwardly sharply as and for the purpose hereinafter described. The opposite or inner end of the base-portion 110 of the outer slide is provided with a stop 116 comprising an inwardly bent substantially rectangular tongue-portion, the stop 116 being encircled by a resilient bumper-band.

Fixedly mounted on the forward half of the base-portion 110 of the outer slide 11 is a longitudinal rack 117 its longitudinal axis being coincident with the longitudinal axis of the base 110. The rack 117 may be formed of any suitable material such as metal, or a plastic such as nylon, and is channel shaped in cross section, its spaced parallel edges having rack teeth 118—118 arranged to be engaged by a pinion gear of the intermediate slide 12 as hereinafter described. The rack 117 is also provided with longitudinally spaced apertures 119 to provide access to the mounting apertures 111 in the base-portion 110 of outer slide 11, some of said apertures being located beneath the rack 117.

The intermediate channel shaped slide 12 is somewhat narrower than the outer slide 11 so as to nest within the latter with close tolerances; and comprises a base-portion 120 having an integral longitudinally extending rib 121 pressed or otherwise struck outwardly from the plane of the base-portion 120 of the slide, its longitudinal axis being coincident with the longitudinal axis of the slide, the height of the rib 121 being sufficient to provide clearance for the rack 117 of outer slide 11 when the two slides are assembled together as shown especially well in FIG. 3. The longitudinal rib 121 is also provided with spaced apertures 122 to provide access to the mounting apertures 111 of outer slide 11. The upper and lower edges or flanges 123 and 124 of the intermediate slide 12 are bent inwardly toward the inner slide 13 as seen in FIGS. 1, 2 and 3. Each flange 123 and 124 respectively is bent or otherwise shaped to provide both an outer and inner ball bearing race as indicated at 123' and 123'' and 124' and 124'', respectively.

Thus, as shown in FIG. 3, when intermediate slide 12 is assembled in the outer slide 11 the upper and lower ball races 123' and 124', respectively, of the intermediate slide 12 are disposed substantially opposite the upper and lower ball races 112' and 113' of the outer slide, thus forming a ball race enclosure extending longitudinally of the assembled slides, the ball race enclosure being adapted to accomodate anti-friction means for supporting the respective slides for longitudinal movement relative to each other as hereinafter described.

Suitable stop means 125 and 126, respectively, are provided at the inner ends of the upper and lower ball races 123' and 124', respectively, of intermediate slide 12 by bending-in portions of the inner extremities of the corresponding flanges. Similarly, stops 127 and 128 are formed at the outer extremities of the upper and lower ball races 123'' and 124'', respectively.

Referring again to FIG. 1 the upstanding rib 121 of intermediate slide 12 is provided intermediate its length with a vertical cut-out 129 suitably profiled to accomodate a pinion gear mounting block 130. As shown in FIG. 5 the latter is a substantially rectangular block, which may be made of metal but is preferably formed of a rigid plastic material such as nylon, and is provided with a central substantially rectangular aperture 131 extending therethrough the upper and lower edges of the aperture being formed with vertically aligned slots 132–132 which give into vertical, axially aligned bearing apertures 133–133. The latter are dimensioned to accomodate the upper and lower trunnions 134—134 of a metal or plastic pinion gear 135 adapted to be rotatably mounted in the aperture 131 of the bearing block. The latter is, in turn, adapted to be locked securely in the vertical cut-out 129 of the rib 121 and to this end each side of the block is formed with locking ribs or tongues 136–136 arranged to slidingly engage in grooves of corresponding cross section formed in the edges of the cut-out 129 of the aforesaid rib 121. When so mounted in the slide 12 the teeth of the pinion gear 135 will project beyond the back of the intermediate slide 12 sufficiently such that when the latter is assembled in the outer slide 11 the pinion teeth will engage its rack teeth 118.

With reference now to the inner slide 13 of the progressive slide assembly, the inner slide 13 is a channel shape member, somewhat narrower than the intermediate slide 12 so as to nest therein with close tolerances; and comprises a base-portion 137 having fastening means comprising a series of apertures 138 extending longitudinally thereof for accomodating screws or bolts for securing the inner slide 13 to a movable member such as for example a file cabinet drawer, high fidelity carriage or the like. It will be understood however that other types of fastening means may be used, such as, for example, bayonets struck outwardly from the base of the slide for easy attachment to a drawer or the like. The upper and lower flanges 139 and 140 respectively of the inner slide 13 are bent inwardly and suitably formed to provide longitudinally extending upper and lower ball races 139' and 140', respectively, the configuration of the ball races being such as to compliment the upper and lower ball races 123'' and 124'' of the intermediate slide 12 and thus form ball race enclosures extending longitudinally of the assembled slides for accomodating anti-friction means for supporting the respective slides for longitudinal movement relative to each other. As shown in FIG. 1 the inner ends of the ball races of the inner slide 13 are provided with stops or protuberances 141–142 formed by bending-in corresponding portions of the flanges 139 and 140; and the opposite or outer end of the inner slide 13 has a stop 143 comprising an inwardly bent tongue of its base-portion 137. The stop 143 is preferably encircled by a resilient bumper band.

Secured to the inside surface of the base-portion 137 of the inner slide 13 and extending longitudinally thereof from a point substantially mid-way of its length to its inner end and coincident with its longitudinal axis is a rack 144 having spaced parallel rack teeth 145–145. The rack 144 is substantially identical in construction to the rack 117 of the outer slide 11 and dimensioned such that when the inner slide 13 is nested in the intermediate slide 12 the teeth of the pinion gear 135 will engage the rack teeth 145—145.

FIG. 2 is a vertical elevation of the progressive slide assembly in which the intermediate channel member or slide 12 is nested in the outer channel member or slide 11 and the inner channel member or slide 13 is nested in the intermediate channel member or slide 12. As mentioned above the nested slides are adapted to be supported in sliding engagement with each other by suitable anti-friction means mounted in the aforementioned ball races. To this end anti-friction means are provided in the form of cord-like ball bearing retainers 146, see FIG. 4, which may be formed of metal but are preferably formed of a plastic material such as nylon, vinyl, polyvinyl chloride (PVC) or polypropylene, each cord-like retainer comprising a central core 147 substantially circular in cross section with integral, laterally projecting ribs 148—148 extending longitudinally of the core and on opposite sides thereof. The core 147 is formed along its entire length with spaced ball receiving apertures 149 in which ball bearings 150 are seated with freedom for rotation. Each ball bearing retainer 146 is adapted to be mounted in one of the longitudinal ball race enclosures of the assembled slides and to this end the diameter of the core of each cord-like ball retainer is slightly less than the diameter of the ball races such that the ball retainers fit freely therein but with the bearing balls making point contact with the ball races; and with the longitudinally extending, laterally projecting ribs of the retainers abutting against the corresponding edges of its ball race to stabilize the retainer therein as shown especially well in FIG. 3a.

In addition to their function of supporting the assembled slides for smooth longitudinal movement relative to each other the ball bearing retainers also serve to limit displacement of the slides relative to each other. Thus, as the inner slide 13 is moved outwardly, that is, to the left as seen in FIG. 2, relative to the fixed outer slide 11, the pinion and rack drive-assembly between the respective slides effects positive progressive action of the inner slide 13 and the intermediate slide 12, both slides moving outwardly simultaneously but the inner slide 13 at twice the speed and distance of the intermediate slide 12. As the inner slide 13 approaches the limit of its travel outwardly the stops 141-142 at its inner end bring up against the adjacent ends of the corresponding ball bearing retainers mounted in the upper and lower ball races between the inner and intermediate slides. Simultaneously the stops 125-126 at the inner end of the intermediate slide 12 bring up against the corresponding ends of the ball bearing retainers located in the upper and lower races between the intermediate slide 12 and the outer slide 11. Further since the opposite ends of the four ball bearing retainers are brought into engagement with the stops 114-115 of the outer slide 11 and stops 127 and 128 of the intermediate slide 12 further movement of the inner and intermediate slides outwardly is prevented.

Upon moving the inner and intermediate slides back into closed position their travel inwardly is terminated by engagement of the inner end of the intermediate slide with the fixed stop 116 of the fixed outer slide 11, further movement of the inner slide 13 relative to the intermediate slide being prevented by engagement of the pinion gear with the two sets of rack teeth one of which is mounted on the fixed outer slide 11.

While the foregoing description has identified the outer channel member 11 as the fixed slide i.e. the slide secured to a fixed component such as cabinet frame or the like; and the slide 13, which is connected to a movable component such as a drawer or the like, as the inner channel member, it will be understood that the nomenclature used may be reversed and that the progressive action of the slides would function equally well.

From the foregoing description and drawings it will be evident that the progressive slide assembly of this invention is of relatively simple construction yet provides extremely smooth sliding action, positive progressive movement and is substantially free of any lateral play or flexing. The progressive slide assembly is thus ideally suited to applications requiring extreme precision for effecting longitudinal sliding movement of one component relative to another.

While the invention has been described and illustrated by the examples included herein it is not intended that the invention be strictly limited thereto and other variations and modifications may be employed within the scope of the appended claims.

We claim:

1. A progressive slide assembly for supporting a movable component for longitudinal displacement relative to a fixed component said progressive slide assembly comprising: an outer channel member arranged to be secured to a fixed component, an inner channel member arranged to be secured to a movable component, and an intermediate channel member, said channel members dimensioned to be assembled in nested relationship and having overlapping edges arranged to form ball races therebetween, anti-friction means arranged to be mounted in the ball races between said outer channel member and said intermediate channel member and between the latter and said inner chamber member to support said channel members for longitudinal movement relative to each other, said anti-friction means comprising ball bearing retainers consisting essentially of cord-like strips of material having apertures spaced longitudinally thereof and ball bearings freely mounted in said apertures, and positive drive means arranged between the inner movable channel member and said intermediate channel member and between the latter and said fixed outer channel member for effecting positive longitudinal movement of said intermediate channel member progressively with the longitudinal movement of said inner channel member.

2. A progressive slide assembly according to claim 1 wherein said cord-like ball bearing retainers have longitudinally extending ribs projecting laterally from opposite sides thereof.

3. A progressive slide assembly according to claim 1 wherein said cord-like material is a plastic.

4. A progressive slide assembly according to claim 3 wherein said plastic material is nylon.

5. A progressive slide assembly according to claim 1 wherein said positive drive means comprises a rack and pinion gear assembly.

6. A progressive slide assembly according to claim 5 wherein said rack and pinion gear assembly comprises a rack fixed to said outer channel member, a rack fixed to said inner channel member and a pinion gear arranged to be rotatably mounted on said intermediate channel member substantially equidistant from the opposite edges thereof to engage the racks of said outer and inner channel members, respectively.

7. A progressive slide assembly according to claim 6 wherein the rack of said outer channel member extends from substantially the center to the outer end of said outer channel member, and the rack of said inner channel member extends from substantially the center to the inner end of said inner channel member.

8. A progressive slide assembly according to claim 1 wherein each of said channel members is characterized by top and bottom flanges the top and bottom flanges of the outer channel member and the intermediate channel member, respectively constructed and arranged to provide outer ball bearing races therebetween, and the top and bottom flanges of the inner channel member and the intermediate channel member, respectively, constructed and arranged to provide inner ball bearing races therebetween, said cord-like ball bearing retainers being engaged in each of said races.

9. A progressive slide assembly according to claim 7 wherein each of said channel members is characterized by a base-portion and top and bottom flanges, the top and bottom flanges of the outer channel member being bent inwardly and the top and bottom flanges of the intermediate channel member being bent inwardly, the said top and bottom flanges of said outer and intermediate channel members respectively, being arranged in nested relationship to provide outer ball bearing races therebetween, and the top and bottom flanges of the inner channel member being bent inwardly toward the inwardly bent flanges of said intermediate channel member and arranged in nested relationship therewith to provide inner ball bearing races therebetween, said cord-like ball bearing retainers constructed and arranged to be assembled in each of said inner and outer ball bearing races, said rack and pinion assembly comprising a longitudinal rack on the inner face of the base-portion of the outer channel member coincident with its longitudinal axis, a longitudinal rack on the inner face of the base-portion of the inner channel member coincident with its longitudinal axis, said pinion gear arranged to be rotatably mounted on the base-portion of the intermediate channel member substantially intermediate opposite ends thereof, and substantially equidistant from the opposite edges thereof, said pinion gear being arranged to engage each of the longitudinal racks of said outer and inner channel members, respectively.

10. A progressive slide assembly according to claim 9 wherein the base-portion of said intermediate channel member is characterized by an upstanding longitudinal rib coincident with the longitudinal axis thereof, said rib having a slot therein substantially intermediate its opposite ends, and a pinion gear mounting block arranged to be engaged in the slot of said longitudinal rib, said pinion gear mounting block arranged to rotatably support said pinion gear in engagement with each of the aforesaid racks.

11. A progressive slide assembly according to claim 9 wherein said assembly is provided with stop means arranged to limit the longitudinal outward and inward movements, respectively, of said intermediate and inner channel members relative to said fixed outer channel member.

12. A progressive slide assembly according to claim 11 wherein the stop means for limiting the longitudinal outward movement of said intermediate and inner channel members comprises protuberances on the outer ends of the ball races of said fixed outer channel member, protuberances at opposite ends of the ball races of the intermediate channel member and protuberances at the inner ends of the ball races of said inner channel member, said protuberances arranged to engage corresponding ends of the ball bearing retainers when said intermediate and inner channel members are at the limit of their outward movement.

13. A progressive slide assembly according to claim 12 wherein the stop means for limiting the longitudinal inward movement of the intermediate and inner channel members relative to the fixed outer channel member comprises a lip on the outer extremity of the inner channel member arranged to engage the outer extremity of the intermediate channel member when said intermediate and inner channel members are at the limit of their inward movement.

14. A progressive slide assembly according to claim 10 wherein the pinion gear mounting block comprises a plastic material.

15. A progressive slide assembly according to claim 14 wherein said mounting block comprises nylon.

* * * * *